May 9, 1933.  E. E. WEMP  1,907,915
CLUTCH CONSTRUCTION
Filed Jan. 2, 1931
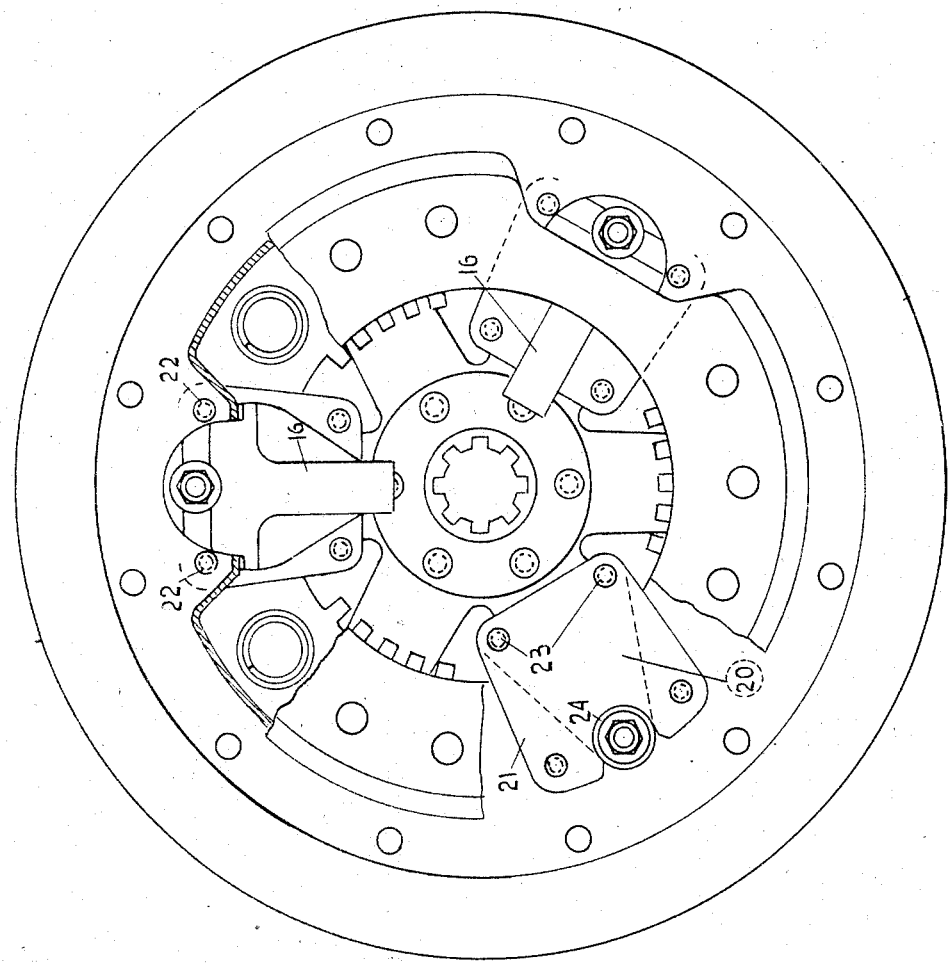
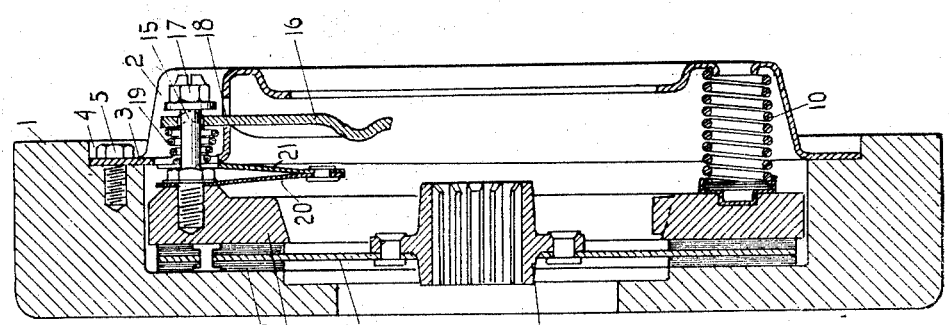
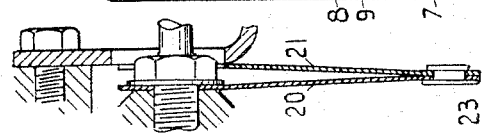
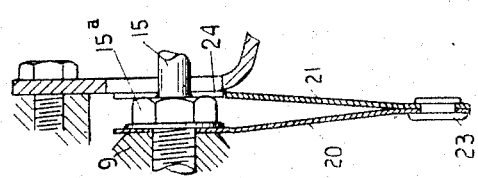
INVENTOR.
ERNEST E. WEMP
BY *Barnes & Kisselle*
ATTORNEYS.

Patented May 9, 1933

1,907,915

UNITED STATES PATENT OFFICE

ERNEST E. WEMP, OF DETROIT, MICHIGAN

CLUTCH CONSTRUCTION

Application filed January 2, 1931. Serial No. 506,012.

This invention relates to clutch construction and especially one of the type used in automotive vehicles although it is to be appreciated that the clutch may be used wherever power transmission is desired. The principal object of the invention is an improved construction which embodies the mounting or carrying of a clutch member in such manner as to permit relative movements between certain of the clutch members for clutch control, and which serves to maintain the movable member in centered or balanced condition.

Fig. 1 is a cross sectional view taken through a clutch construction embodying the present invention.

Fig. 2 is a face view with some parts cut away and some in section.

Fig. 3 is a view which depicts the carrying members for a movable clutch part showing one position which may be assumed.

Fig. 4 is a view similar to Fig. 3 showing another position.

Referring now to the drawing:

The flywheel of an engine is illustrated at 1 and secured to the flywheel is a clutch cover-plate 2. The attachment may embody parts comprising a flange 3 on the cover fitted into a recess 4 in the flywheel with cap screws 5 taken through the flange. The details of such mounting need not be further described herein; suffice to say that in a copending application Serial No. 504,841, filed December 26, 1930, the details of such a cover-plate mounting and flywheel are set forth, and the present flywheel cover-plate construction may follow that of the said application. However the present invention is independent of the details of the mounting and flywheel, cover-plate construction.

A driven hub 6, which is adapted to be received upon a driven shaft is provided with a driven disc 7 with clutch facing material 8. A clutch pressure ring is shown at 9 acted upon by packing springs 10 which are backed up by the cover plate and serve to urge the pressure ring toward the fly wheel so that the facing material 8 of the driven disc is frictionally engaged between the fly wheel and pressure ring. The pressure ring is shiftable axially so that the clutch may be controlled for releasing or engaging the driven disc.

To thus axially shift the pressure ring against the action of the packing springs 10 the same is equipped with a number of studs 15 associated with levers 16, and on the end of the studs may be nuts 17. Each of the levers fulcrum on the cover-plate as at the point 18 and may be held against nuts 17 by springs 19. As shown in Fig. 2, there may be three of such levers, and when they are rocked clockwise (Fig. 1) the pressure ring 9 is retracted and the packing springs 10 compressed and the clutch released. To engage the clutch, the levers are freed and the packing springs return the pressure ring to clutch engaged position.

So much of the clutch construction is subject to large variation, as the flywheel, cover-plate, pressure ring and actuating means may be differently designed both as regards the individual elements and the manner of their association. The matter of particular importance involves the mounting and carrying of the pressure ring to permit of its axial shifting movement to the substantial elimination of friction in this action and at the same time to permit of straight line axial movement.

The pressure plate may be carried by one of the relatively fixed members, that is, the flywheel or cover-plate, while if carried by the cover plate it is indirectly carried by the flywheel, and flexible devices are provided for this purpose which flex to permit of axial movement. Moreover, the flexible members are so arranged to permit of straight line movement of the points of connection between the pressure plate and the flexible carrying member. In the present form two properly associated flexible members are provided, one being shown at 20, and the other at 21. These may be in the form of metal plates or sheet metal members. The member 20 which may be termed the inner one may be of triangle shape, as illustrated in Fig. 2, secured at its apex to the pressure ring. For this purpose the studs 15, which serve for lever attachment, may be utilized, each stud passing through an aperture near the apex of each plate 20 with the head 15a seating against the plate. The plate 21 may partake of a general four sided or rectangular shape and it may be mounted to the cover plate as at two points 22, by suitable rivets or the like, as shown in Fig. 2. The two plates 20 and 21 are connected together as by means of suitable rivets or the like, preferably at or near their inner edges as shown at 23. The plate 21 may be cut away or slotted, as at 24, to permit the stud 15 to pass therethrough and to reciprocate in regard thereto.

These two plates 20 and 21 may be normally flat; that is to say, when secured together by rivets 23 and before attachment to pressure ring and cover plate, respectively, they may lie flush with each other. In the axial shifting of the pressure plate these two members move toward and away from each other much as if they were fulcrumed to each other at or near the points of attachment 23. This is shown in Figs. 3 and 4. When the clutch is engaged the two members are slightly spread apart after the manner illustrated in Fig. 3 by reason of the pressure plate being urged up against the driven disc by the packing springs 10. As the pressure plate is retracted however by actuation of the levers 16 the members approach each other after the manner illustrated in Fig. 4; thus it is that the pressure ring may be held positively in centered or balanced condition, while at the same time members 20 and 21 permit of axial shifting. Where the shiftable member, such as the pressure plate 9 is mounted to axially shift upon pins or guideways, sufficient clearance must be provided for ease of operation and to take care of expansion and contraction due to heat changes. This clearance permits the member to shift radially with the result that it is not maintained accurately balanced or centered. With the present construction, however, although it is permitted to shift axially it is positively held from radial shifting. Moreover, friction which would occur between the shifted member and its guide devices or pins, is eliminated and this is advantageous because such friction increases as the clutch engages and picks up the load thus requiring the packing springs to overcome this added friction. By thus eliminating any frictional sliding action high efficiency is obtained in the packing springs.

The pressure ring is rigid and of necessity the points of connection between the pressure ring and plates 20 must move in a straight line. The present construction readily permits of this; as shown in Fig. 3 where the members 20 and 21 are relatively widely separated the points of connection 23 shift slightly outwardly, or at any rate, it is slightly outward from the position shown in Fig. 4. When the members 20 and 21 approach each other, as in the disengaging of the clutch the points of connection 23 are free to shift slightly inwardly. Thus it is that while the free ends of the members 20 and 21 are rigidly held by cover-plate and pressure ring, respectively, the points of connection between the two are floating, so to speak, and capable of shifting as the stud 15 shifts axially in a straight line. Thus, there is no binding or cramping tendency incident to the straight line shifting of the points of connection between members 20 and the pressure ring. As above stated, the members 20 and 21 may normally be flush with each other, in which case they would always be under slight tension as shown in position in Figs. 3 and 4. However, it is feasible and within the invention to suitably shape the members 20 and 21 so that normally they assume a position similar to that of Fig. 3 or Fig. 4.

I claim:

1. In a clutch, the combination of two clutch members, one shiftable axially with respect to the other, means entirely supporting one member from the other and adapted to hold the said one member against relative radial shifting, said means comprising flexible metal plates secured together and spaced from each other away from the point of said securing, and means for securing the flexible metal plates, respectively, to the two clutch members.

2. In a clutch, the combination of two clutch members, one shiftable axially with respect to the other, means entirely supporting one member from the other and adapted to hold the said one member against relative radial shifting, said means comprising flexible metal plates secured together and spaced from each other away from the point of said securing, and means for securing the flexible metal plates, respectively, to the two clutch members whereby as the two clutch members shift axially the points of connection between the flexible plate members may shift radially to permit of straight line axial shifting as between the said two clutch members.

3. In a clutch, the combination of a flywheel or the like, a clutch cover-plate, a flexible plate of generally rectangular shape secured fixedly to the cover-plate and extending radially inwardly, an axially shiftable pressure ring, means for shifting the same, a flexible plate of generally triangular shape fixedly secured at its apex to the pressure ring and extending radially inwardly, means fixedly securing said two plates together at a radially inward point, said rectangular plate being provided with a notch, and means projecting from the pressure plate through said notch and adapted to be controlled by said means for effecting axial shifting of the pressure plate.

4. In a clutch, the combination of two clutch members, a plurality of circumferentially arranged, spaced, flexible, plate members, means connecting said plate members to one of the clutch members at at least two points, said plate being disposed substantially radially, a cooperating plate for each of the first mentioned plates, means securing said cooperating plates with the first mentioned plates at at least two points and adjacent the edges of the plates, said cooperating plates being disposed so as to substantially face the first mentioned plates, and means connecting each cooperating plate at a single point of connection with the other of said clutch members whereby said plates constitute a torque resisting drive connection between said members, the portions of the plates connected to said clutch members being normally spaced apart and adapted to be flexed toward and away from each other in the relative axial shifting of the clutch members.

5. In a clutch, the combination of two clutch members rotatable with each other and capable of relative axial shifting, a plurality of pairs of plates circumferentially arranged in spaced relation, said plates being disposed substantially radially, one of said plates being substantially rectangular and the other of said plates being substantially triangular in shape, means securing two corners of the rectangular plate to one clutch member, means securing the other two corners of the rectangular plate to two corners of the triangular plate, and means securing the apex of the triangular plate to the other clutch member, said plate members serving to support one clutch member from the other and establish a drive connection between them, the apex of the triangular plate being normally axially spaced from the adjacent edge of the rectangular plate and said edge and apex being adapted to shift toward and away from each other in the relative axial movement of the clutch members.

In testimony whereof I affix my signature.

ERNEST E. WEMP.